United States Patent [19]

McEwen

[11] Patent Number: 4,997,127

[45] Date of Patent: Mar. 5, 1991

[54] ELECTRIFIED LIVESTOCK CONTROLLER

[76] Inventor: James P. McEwen, 220 Dewey, Plainview, Ark. 72857

[21] Appl. No.: 423,375

[22] Filed: Oct. 19, 1989

[51] Int. Cl.$^5$ ............................................. B68B 11/00
[52] U.S. Cl. .................................. 231/7; 273/84 ES; 361/232
[58] Field of Search ............... 231/7; 119/29, 96, 108; 273/84 ES; 361/232

[56] References Cited

U.S. PATENT DOCUMENTS

| | | | |
|---|---|---|---|
| 2,304,968 | 12/1942 | Torbeck et al. | 40/431 X |
| 3,722,788 | 3/1973 | Petrecz | 231/7 |
| 3,819,108 | 6/1974 | Jordan | 273/84 ES X |
| 4,202,293 | 5/1980 | Gonda et al. | 119/29 |
| 4,274,123 | 6/1981 | Rogers, Jr. | 361/232 |

Primary Examiner—Robert P. Swiatek
Attorney, Agent, or Firm—Stephen D. Carver

[57] ABSTRACT

An electrified livestock controller for guiding animals, preferably pigs, doubles as a gate and a prod. The controller comprises a central panel of generally planar dimensions, comprising a plurality of central, vertically disposed ribs separated from one another by elongated slots. One or more similar accessory panels are hingedly connected to each side of the central panel. The hinge structure facilitates adjustment of the controller for deployment in a variety of configurations. The hinge structure comprises a detent system having a plurality of indexing disks which, when yieldably mated together, facilitate positioning of the panels in a custom configuration. Suitable flush mounted electric strips are defined on all of the ribs, to provide a shocking effect without tissue damage. The system includes a removable cattle prod which, besides functioning as a handle, can be withdrawn from the handle to separately prod animals. Either concurrently with or independently of rib electrification, audio and/or visual effects may be generated to cause Pavlovian conditioning in the animals. A preferred visual effect of ascending motion, which may be induced by a revolving curtain displaying a spiral image, motivates the animals like a prod. The curtain is best operatively disposed behind the vertical ribs of at least one of the panels.

26 Claims, 3 Drawing Sheets

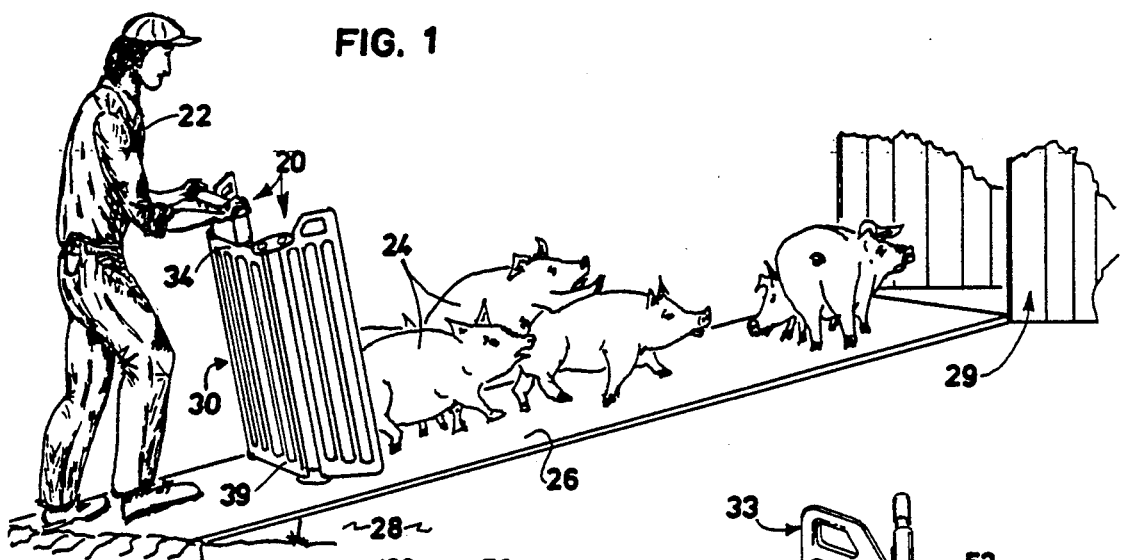
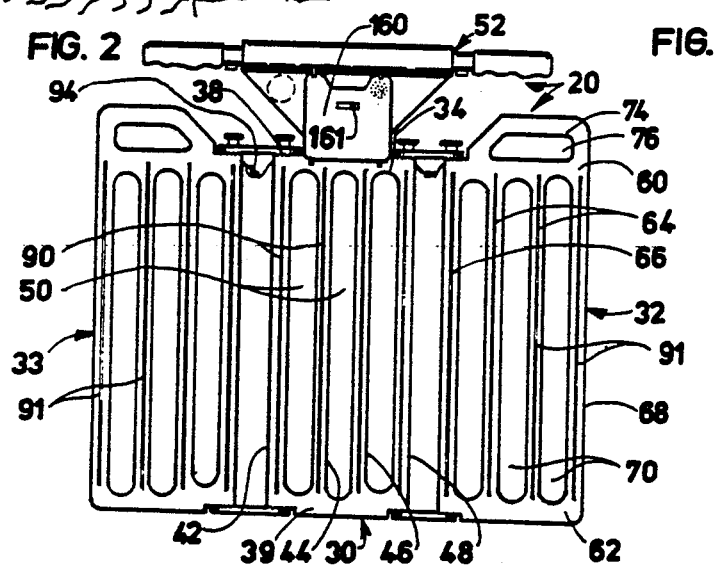
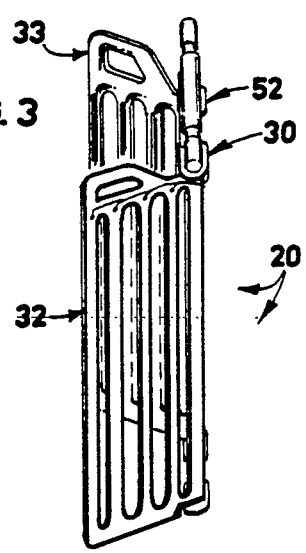
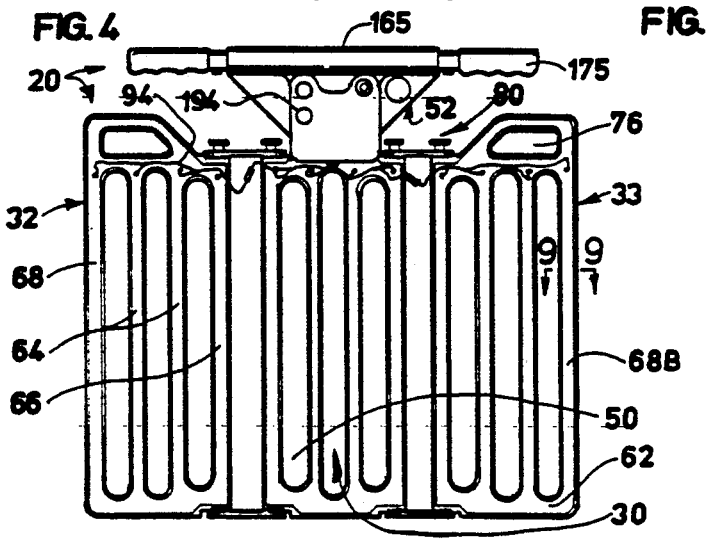
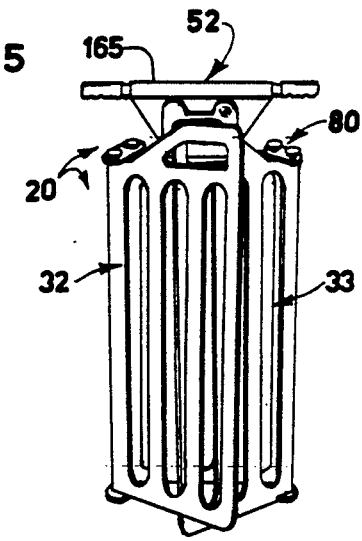

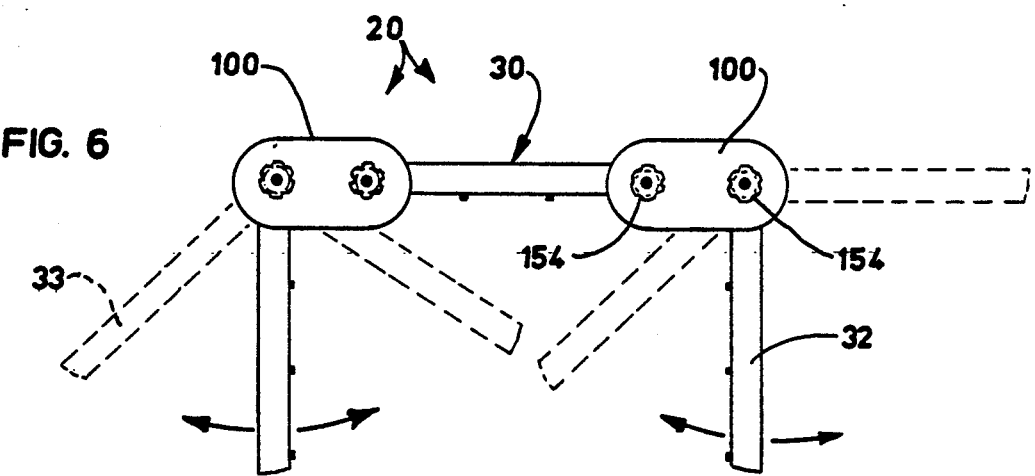
FIG. 6
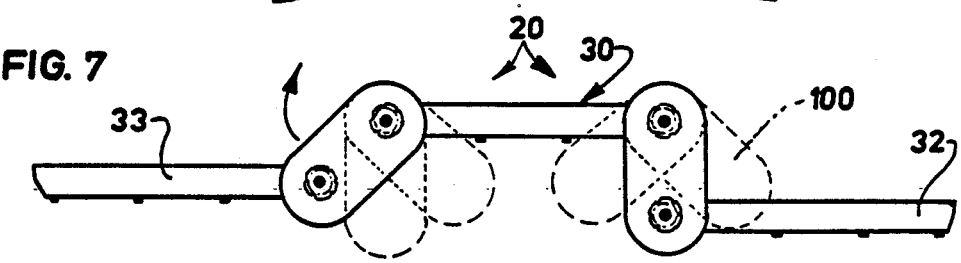
FIG. 7
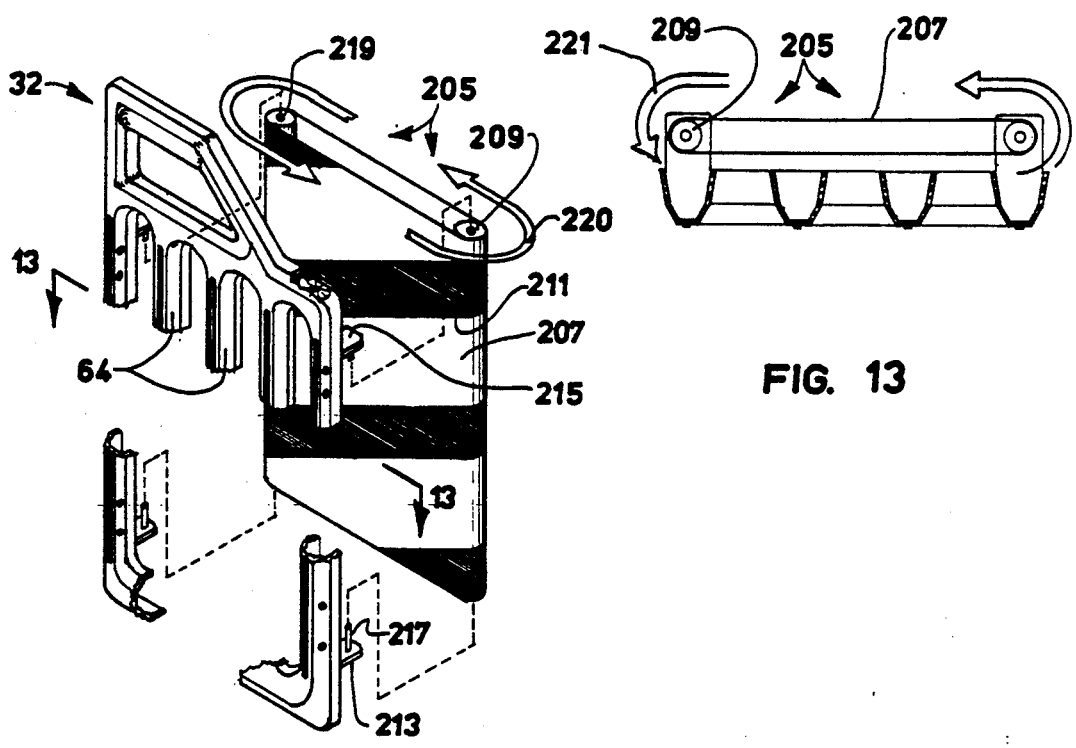
FIG. 13
FIG. 12

ELECTRIFIED LIVESTOCK CONTROLLER

BACKGROUND OF THE INVENTION

The present invention relates broadly to electrified animal prods. More specifically the present invention relates to an electrified livestock guide panel for manipulating animals such as pigs. The invention is believed best classified in United States Class 231, subclass 7.

The prior art suggests electrified livestock guides. Moreover, it is previously known to provide an electrified livestock guide consisting of a central panel having a manual handle attached to it. U.S. Pat. No. 4,128,200, issued Dec. 5, 1978, discloses such a livestock guide. It discloses a generally rectangular panel having a plurality of outwardly projecting electrified contacts. Typical electrical animal prods are seen in U.S. Pat. No. 4,367,843, issued Jan. 11, 1978.

However prior art devices exhibit numerous shortcomings. Electrodes which project outwardly from the control housing can induce tissue damage in livestock. Naturally, when animals experience vigorous electric shock, they may respond by panicking. When an alarmed animal panics, he may violently contact the prod, and outwardly projecting electrode tips may penetrate the skin or eyes of the animal, resulting in physical damage and therefore loss of value.

Known devices may include electrodes arranged in spaced apart horizontal arrays. When startled hogs, for example, jump toward the electrified guide, they may try and use horizontal structures as climbing steps. Violent kicking may result. Another disadvantage is that excrement collects on the horizontal members, and tends to obscure the electrical contacts.

Other relevant prior art consists of U.S. Pat. No. 4,394,956, issued to Andrews on July 26, 1983; U.S. Pat. No. 4,424,932, issued Jan. 10, 1984 to Allen. These battery powered devices are easily manipulable and fairly inexpensive to produce. However, there are several major disadvantages associated with such devices. While the electric shock stimulates the animal to move, the prod provides no visual barrier or guide to train the animal in the desired direction of travel. Thus such equipment is ineffective to guide the animal without the use of physical barriers such as a loading chute or the like. The operator using such a prod is at risk of being attacked or trampled where no physical barrier exists, it would seem desirable to provide a controller device which combines the advantages of the hand-held prods with means for presenting a visual barrier for guiding the animals.

Hence it is desired to provide a panel-type livestock guide having improved electrodes which do not injure the animal and are not easily obstructed or damaged. Moreover, it would be desirable to provide a panel prod with extendible panel members for improved visual and physical guidance. It is well known from animal studies that animals can be readily trained to respond to audio and visual signals associated with electric shocks. The pig has proven to be particularly intelligent and easily trained. It would thus seem desirable to provide a conditioning stimulant with a prod device so that the applications of tissue-damage from electric shock could be reduced.

In particular, it has been observed that animals respond in like order to prerecorded sounds of fear and pain. In other words, when an initial electric shock evokes an aural response in the animals, playback of the recorded response with or without an accompanying shock precipitates the same controlling response in the animals.

Finally it is desired to provide a panel type controller which can be used in conjunction with existing electric prods.

SUMMARY OF THE INVENTION

The present invention comprises an electrified livestock controller which may be readily manually manipulated by a workman to herd and direct livestock such as pigs. The instant controller concurrently functions as a portable gate and a cattle prod. It may be folded into desired configurations to adapt itself for use in differing conditions.

A central, generally planar control panel is preferably mated to a pair of spaced apart, accessory panels. The central panel and both accessory panels comprise similar electrified vertical ribs. The hinge structure interconnecting the accessory panels with the control panel provides for angular variation in panel orientation. The accessory panels may be deployed in different folded and extended positions to vary the overall size of the controller as desired.

Each of the panels includes a plurality of vertically extending, generally parallel ribs, which are disposed in orderly spaced apart fashion. Each rib mounts a thin flush mounted conductor strip which longitudinally projects along its edge. A suitable handle is provided for manipulation of the controller so that it may be manually aimed or moved into a desired orientation. Preferably the handle is disposed at the top of the control panel, adjacent a control housing.

The preferred hinge structure enables the accessory panels to be yieldably locked into a variety of configurations. The corners of the central panel and the inner corners of the accessory panels comprise indexing disks adapted to mate with similar indexing disks formed on the hinge structure. The indexing disks provide a detent function, since when mated together they yieldably lock the panels in position. The effective width of the controller may thus be varied to facilitate use of the controller upon loading ramps of different sizes, or within corridors or passageways of varying dimensions.

A handle system at the top of the control panel comprises an adjustable handle bar which may be configured in a variety of orientations. The handle bar comprises a tubular housing and separate hand grips which may be fitted within the housing. The housing may comprise a receptor for receiving a removable electrified cattle prod which, when installed, electrically activates the strips. When the conventional prod is inserted into the handle housing, it functions as a handle bar in cooperation with the other handle structure.

In the best mode circuit means are provided for generating sound each time the strips are electrified. The sound may be from a buzzer or bell, or from a device such as a cassette player. Alternatively, a light may be provided to generate a visual signal whenever electrification occurs, ideally in darker conditions.

I have discovered that the visual phenomena of "ascending motion" (i.e. apparent vertical movement of a body) tends to motivate and guide animals nearly as well as electrified prods, but without shocking the animals. Thus a preferred additional visual signal may be provided by an ascending motion simulator, which may be employed alone or coupled together with the aforedescribed panels. The ascending motion simulator preferably comprises a spindle-mounted, revolving belt or curtain displaying a spiral image, similar in concept to a Barber shop sign. The revolving curtain is best mounted behind spaced-apart vertical members, such as the ribs of the preferred panel, which tend to obscure the image. Such a revolving spiral pattern tends to urge the observers' eyes upwardly as the image is examined.

Either the selected visual signal(s) and/or an audio signal may be generated without electrifying the strips, and the hogs or other animals being directed by the controller will react because of Pavlovian conditioning. In this matter batteries are conserved.

Therefore a basic object of the present invention is to provide a livestock controller of the character described which will reliably operate in adverse conditions, and which may be varied in width depending upon the condition.

Another object of the present invention is to provide a livestock controller of the character described which will not collect excrement during use.

It is an object of the present invention to provide an electrified livestock controller which minimizes the risk of injury to the animal.

Another object is to provide an electrified controller of the character described which may double as a portable gate or barrier and a cattle prod.

It is a basic object of the present invention to provide conditioning stimulus for training an animal to respond to the presence of the controller without the use of an electric shock.

Another object is to provide a livestock controller of the character described which, during operation, need not be continually electrified. It is a feature of the present invention that visual or audio displays may be generated in conjunction with electrification, until such time as the animals being herded become aware of the device's shock potential, at which time they will move in a desired direction merely by visual displays or sound.

Thus another object is to provide a livestock controller which provides an audible warning signal.

Another broad object of the present invention is to provide a livestock controller which can be manipulated into a plurality of selected positions to guide an animal in the desired path.

Yet another object of the present invention is to provide a hand-held electrified livestock controller which has flush mounted electrode elements to prevent tissue damage to the animal.

Still another object of the present invention is to provide a livestock controller of the nature described which may be retrofitted for use in conjunction with a conventional stick type prod. It is a feature of the present invention that the preferred handle structure may receive a conventional cattle prod for electrification.

Another object is to provide a controller of the character described which can easily be repaired in the field. It is a feature of the device that one or both of the accessory panels may be removed from service without rendering the controller inoperable.

It is another object of the present invention to provide a livestock controller of the character described which may be folded into a convenient shipping position.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 1 is a fragmentary, pictorial view illustrating my ELECTRIFIED LIVESTOCK CONTROLLER in use guiding a plurality of pigs up a typical loading ramp;

FIG. 2 is a front elevational view of my ELECTRIFIED LIVESTOCK CONTROLLER;

FIG. 3 is a top perspective view of my ELECTRIFIED LIVESTOCK CONTROLLER, showing the accessory panels in a moved position;

FIG. 4 is a rear elevational view thereof;

FIG. 5 is a front elevational view thereof, with the accessory doors folded to a substantially closed position;

FIG. 6 is an enlarged, top, diagrammatic sectional view illustrating movement of the accessory panels;

FIG. 7 is a view similar to FIG. 6, but illustrating how the hinge linkage may be deployed in alternative configurations;

FIG. 12 is fragmentary exploded view of the optional ascending motion simulator, with portions thereof broken away or shown in section for clarity; and, FIG. 13 is a fragmentary sectional view taken generally along line 13—13 of FIG. 12, with portions thereof broken for clarity or omitted for brevity.

DETAILED DESCRIPTION

Figure 8:
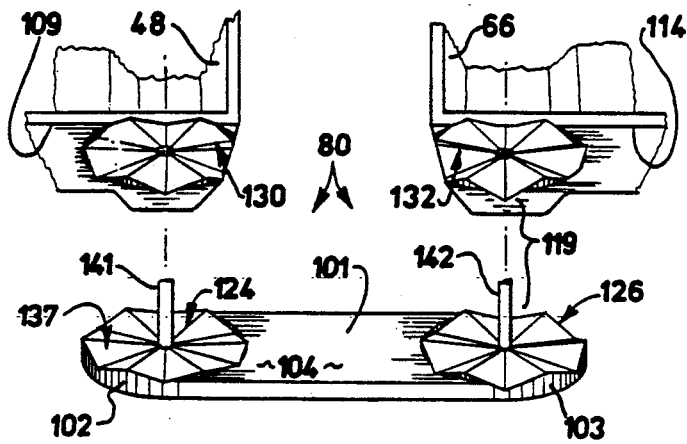
FIG. 8 is an enlarged, fragmentary view of the preferred detent indexing disks employed with the hinge means, with portions thereof broken away for clarity.

With initial reference directed now to FIGS. 1 through 5 of the appended drawings, an electrical livestock controller constructed in accordance with the teachings of the present invention has been generally designated by the reference numeral 20. Controller 20 may be conveniently manually manipulated by a workman 22 (FIG. 1) who may guide animals such as pigs 24 in a desired direction. As illustrated, workman 22 is attempting to urge animals 24 up a suitable loading ramp 26 extending from the ground 28 to a trailer 29. Controller 20 thus concurrently functions as a gate or barrier and a prod. In actual use workman 22 may find it necessary to move livestock through paths or chutes of various configurations, sizes and dimensions. Accordingly, controller 20 may be varied in width or configuration as desired to suit the individual application.

As best viewed in FIGS. 2 through 5, controller 20 comprises a central control panel, generally designated by the reference numeral 30, which, in the best mode, is hingedly associated with a pair of similar, cooperating accessory panels 32 and 33. Control panel 30 comprises a top and a bottom generally designated by the reference numerals 38 and 39 respectively. It comprises a plurality of spaced-apart, vertically extending ribs 42, 44, 46, 48 which span between top 38 and a bottom 39.

A plurality of similar elongated slots 50 are defined between adjacent ribs. Ribs 42 and 48 respectively define sides of the control panel, which sides are preferably hinged to the accessory panels as will be hereinafter explained in detail. Top 38 is secured to a handle means generally designated by the reference numeral 52. Each of the accessory panels 32, 34 are similar, generally comprising a mirror image of one another.

Accessory panel 32, for example, comprises a top generally designated by the reference numeral 60, which is spaced apart from an integral bottom 62. Panel 32 comprises a plurality of vertically extending longitudinal ribs 64, 66, and 68. Elongated slots 70 defined between adjacent ribs are virtually identical to slots 50 previously discussed. Inner ribs 66 define the inner side of each accessory panel, and the outer rib 68 defines the outside. It will be noted that a handle member 74 is defined in top 60, providing an orifice 76 through which one's hand and fingers may be extended for manipulating the apparatus. The accessory panels are pivotally associated with the sides of the central control panel through hinge structure 80 to be hereinafter described.

Figure 9:
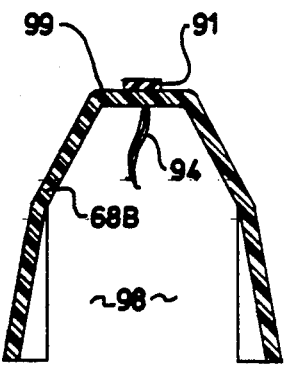
FIG. 9 is an enlarged, fragmentary, sectional view taken generally along line 9—9 of FIG. 4.
Figure 10:
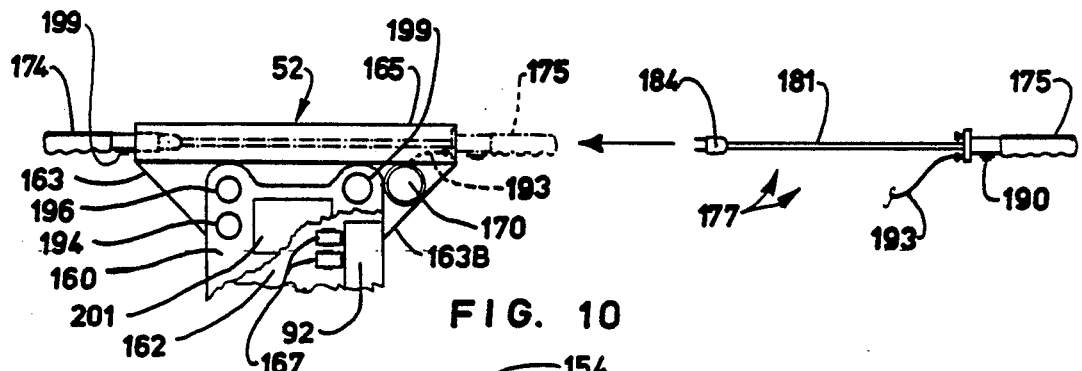
FIG. 10 is an exploded, fragmentary, diagrammatic view of the preferred handle means.

The controller shocks livestock through flush mounted strips 90 or 91 provided on the various ribs. The electrically conductive strips 90 are actuated by a conventional circuit 92 (FIG. 10) to be described hereinafter. Similar strips 91 defined in the ribs of the accessory panels are electrically interconnected with strips 90 via insulated conductors 94. As best viewed in FIG. 4, the conductor 94 which delivers high voltage to each of the strips is substantially nested within the hollow top of the accessory panels and top of the central panel. As best viewed in FIG. 9, a typical rib 68B comprises a generally hollow interior 98 and a leading face 99. The conductor 91 is disposed in the leading face 99 and the conductor 94 conventionally electrifies it. Thus each of the electrode strips 90, 91 electrically wired in parallel and they may freely contact the animals 24 to shock them without tissue damage.

Figure 11:
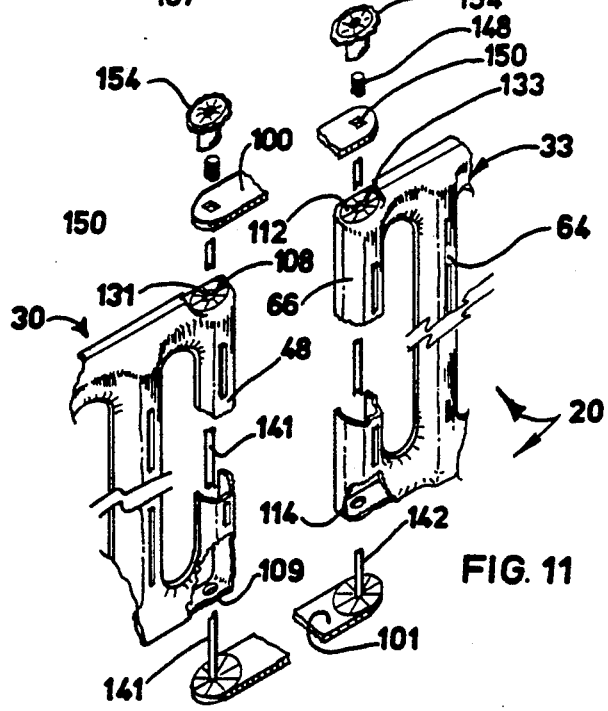
FIG. 11 is an exploded, fragmentary, isometric view showing how the accessory panels are hingedly linked to the control panel, with portions thereof broken away or shown in section for clarity.

With additional reference now primarily directed to FIGS. 8 and 11, the hinge structure has previously been designated by the reference numeral 80. Its function is to link the accessory panels 32 and 33 with the central panel 30 so that the accessory panels may be temporarily yieldably locked into a desired configuration. The hinge structure preferably comprises two pairs of links, one pair for each accessory panel. Each pair comprises an upper link 100 and a similar lower link 101 (FIG. 8). Each hinge may be yieldably maintained in a preselected orientation through a detent system. Link 101 (FIG. 8) comprises a pair of spaced apart ends 102, 103 and a face 104 which is forced into contact with the panels. The detent system comprises indexing disks associated with the links for coupling to similar indexing disks associated with the panels.

As viewed in FIG. 11, the outer rib 48 of central panel 30 comprises a top corner 108 and a bottom corner 109. Similarly, the accessory panel 33 comprises a side formed by rib 66 which extends between a top corner 112 and a bottom corner 114. The hinge system comprises a detent means generally designated by the reference numeral 119 (FIG. 8). A pair of similar indexing disks generally designated by the reference numeral 124 and 126 are defined on opposite sides of face 104 of lower link 101. A similar indexing disk 130 is defined at each bottom corner of the central panel and an identical indexing disk 132 is defined upon the upper and lower corners of the inner sides of each accessory panel. Similar indexing disks 131 and 133 (FIG. 11) are defined at the top of the panels.

Each of the indexing disks is substantially similar, comprising a plurality of radially spaced apart generally pyramidal segments 137 (FIG. 8) which mate when the indexing disks on the links are forced into the indexing disks on the various panels. The underside of upper link 100 (not shown) is preferably configured substantially identically with face 104 of lower link 101. In the best mode a pair of elongated, threaded rods 141, 142 associated with the hinge system anchored within opposite sides of link 101 extend upwardly through the panels. Rod 141 concentrically extends interiorly of rib 48, and rod 142 extends concentrically through the interior of accessory panel rib 66. The preferably threaded and squared rod ends 148 penetrate suitable square orifices 150 defined in link 100, and they are threadably mated to suitable threaded knobs 154 which may be manually twisted to force the hinge structure together.

When the knobs 154 are tightened, they will compress upper link 100 against the panels, and rods 141, 142 will be drawn upwardly, forcing lower link 101 against the bottom of the panels. At this time indexing disks 124 will be forced into engagement with disk 132 at the bottom of the controller. At the same time upper link 100 will be forced into engagement with indexing disks 131, 133 at the top of the apparatus. Since the various disk segments will mesh to prevent inadvertent torsional displacements, it will be apparent that the accessory panels may be yieldably oriented in a variety of configurations. Also, it will be apparent that the detent function results from the meshing of disk segments 137.

For example, in FIG. 6 the spaced apart upper links 100 which extend between the central panel 30 and the opposed accessory panels 32, 33 are illustrated in substantial alignment with the top of the central panel 30. However, the dashed lines indicate that the accessory panels 32, 33 may be selectively deployed in a variety of configurations. It will be appreciated from FIG. 7 that the innermost knobs 154 may be released and then readjusted so as to position the accessory panels 32, 33 in an off-set configuration, wherein links 100 (and lower links 101 not shown) will be disposed angularly with respect to the control panel 30. Of course a variety of intermediate positions may be assumed as well.

With primary reference now directed to FIGS. 2-4 and 10, the handle system 52 comprises a resilient, generally box-like housing 160 which is secured atop the central panel 30. Its hollow interior 162 may mount a conventional battery powered circuit 92 which converts low voltage power into suitable high voltage. A variety of conventional solid state circuits may be used, and a conventional multi-vibrator circuit is preferred. Power supply housing 160 mounts a transverse tubular handlebar 165 which is reinforced by suitable webs 163. Suitable batteries 167 disposed within the interior 162 power the apparatus as well as an optional audio transducer 196. The handlebar 165 is generally tubular, and it comprises a fixed hand grip 174 and a removable hand grip 175 (associated with prod assembly 177) concentrically fitted to it at its opposite ends. As viewed in FIG. 10, grip 175 may be withdrawn from handle 165 if desired to separately shock or poke an animal.

The handle 162 can receive removable prod 177. Prod 177 comprises the handgrip portion 175, associated with the elongated shaft 181 terminating in shocking element 184 which is normally shrouded within handle 165 unless assembly 177 is temporarily removed. Line 193 comprises a plurality of well-insulated electrical conductors, one of which is electrically connected with the high voltage lines 94 (FIG. 4) already discussed, to electrify shaft 181. When assembly 177 is inserted into handle 165, a retractable cord reel 170 rewinds extensible cord 193. A push-button switch associated with prod assembly 177 has been generally designated by the reference numeral 190. Line 193 includes suitable electrical conductors coupled to batteries 167 and interconnected with button 190 to activate controller 20 and prod assembly 177.

The housing 160 also preferably comprises an auxiliary stimuli system. Function switch 161 (FIG. 2) selects desired systems. Thus electric light 194 and a conditioning buzzer or bell 196 can both be activated when switch 161 is deployed. Button 199 (FIG. 10) can operate the buzzer and/or lights independently of high voltage electrification, and simple conventional circuitry is used. Once the hogs or other animals are repeatedly exposed to the shocking effects of the prod, they will be quickly conditioned to react to sounds or visual stimuli if pushbuttons 190 and 199 are concurrently depressed. Thereafter repeated electrification will be unnecessary, and as a result battery life will be increased.

Alternative audio stimuli are generated from an optional conventional cassette playback unit 201 which may be employed to generate audio sounds from prerecorded tapes. I have found that the prerecorded sounds of distressed animals reacting to shock are ideal audio conditioning stimuli.

Alternative visual stimuli may be generated from the optional ascending motion simulator 205 (FIGS. 12, 13). Simulator 205 comprises a rotatable belt-like curtain 207 entrained for rotation between spaced apart spindles 209. The spindles may be supported by suitable supports 213, 215 having axles 217 adapted to register with spindle orifices 219. Curtain 207 is marked with a spiral pattern 211, which emulates a Barber pole. When the curtain is rotated as indicated by arrows 220 and 221, an illusion of vertically moving ascending motion is seen by the animals. Preferably the curtain should be disposed adjacent the vertical ribs 64 to amplify the illusion. I have discovered that pigs willingly move away from such a visual stimulus, even without electrification of the controller 20.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An electrified livestock controller for guiding animals such as pigs in a desired direction, said controller comprising:

a control panel comprising a top, a bottom, and a pair of sides, said control panel comprising a plurality of vertically oriented ribs spaced apart between said sides and extending between said top and said bottom;

a plurality of conductor strips, each strip longitudinally disposed upon one of said ribs for contacting and shocking animals;

a plurality of elongated slots, a slot disposed between adjacent ribs;

handle means associated with said control panel for facilitating manual manipulation of said controller;

at least one movable accessory panel operatively associated with said control panel, said at least one accessory panel comprising a top, a bottom, inner and outer sides, a plurality of vertically oriented panel ribs spaced apart between said inner and outer sides and extending between said accessory panel top and said accessory panel bottom, and a plurality of accessory panel conductor strips for shocking animals, said last mentioned conductor strips electrically interconnected with said control panel strips, each accessory panel strip longitudinally disposed upon one of said panel ribs for contacting and shocking livestock;

hinge means for operatively pivotally linking said at least one accessory panel to said control panel;

said control panel comprising top and bottom corners defined upon at least one of its sides;

said at least one movable accessory panel comprising top and bottom corners defined upon its inner side; and, said hinge means comprising an upper link extending between a top corner of said control panel and the top corner of the inner side of said at least one accessory panel, and a lower link extending between a bottom corner of said control panel and the bottom corner of the inner side of said at least one accessory panel.

2. The controller as defined in claim 1 wherein said hinge means comprises detent means for yieldably maintaining said at least one accessory panel in a desired orientation relative to said control panel.

3. The controller as defined in claim 2 wherein said detent means comprises a plurality of indexing discs which are configured to be mated together, separate indexing discs being associated with the top and bottom corners of said control panel, with the top and bottom corners of the inner side of said at least one accessory panel, and with opposite ends of said links, whereby the indexing discs associated with said links will engage with the discs defined on said control panel and said at least one accessory panel when said detent means is engaged.

4. The controller as defined in claim 2 wherein said hinge means comprises knob means for selectively compressing said indexing disks together, and threaded rod means associated with at least one side of said control panel and with the inner side(s) of said at least one accessory panel adapted to threadably receive said knob means, thereby facilitating the selective manual deployment of said controller in a desired configuration.

5. The controller as defined in claim 1 wherein said handle means comprises a removable prod associated with said top of said control panel.

6. The controller as defined in claim 5 wherein said handle means comprises a tubular housing and separate hand grips adapted to be fitted within said tubular housing.

7. The controller as defined in claim 6 wherein said housing comprises receptor means for receiving said removable electrified prod and means for electrifying said prod.

8. The controller as defined in claim 1 including signal means for producing a conditioning stimulus for training said animals to respond to the presence of said controller even in the absence of an electric shock, said signal means comprising a visual ascending motion generator.

9. The controller as defined in claim 8 wherein said signal means comprises sound generating means.

10. An electrified livestock controller for guiding animals such as pigs in a desired direction, said controller comprising:
- a control panel comprising a top, a bottom, and a pair of sides, said control panel comprising a plurality of vertically oriented ribs spaced apart between said sides and extending between said top and said bottom;
- a plurality of conductor strips, each strip longitudinally disposed upon one of said ribs for contacting and shocking animals;
- a plurality of elongated slots, a slot disposed between adjacent ribs;
- handle means associated with said control panel for facilitating manual manipulation of said controller;
- signal means for producing a conditioning stimulus for training said animals to respond to the presence of said controller even in the absence of an electric shock, wherein said signal means comprises a visual ascending motion generator.

11. An electrified livestock controller for guiding animals such as pigs in a desired direction, said controller comprising:
- a control panel comprising a top, a bottom, and a pair of sides, said control panel comprising a plurality of vertically oriented ribs spaced apart between said sides and extending between said top and said bottom;
- a plurality of conductor strips, each strip longitudinally disposed upon one of said ribs for contacting and shocking livestock;
- means for selectively electrifying said conductor strips;
- handle means associated with said control panel for facilitating manual manipulation of said controller, said handle means comprising receptor means for receiving a conventional electrified cattle prod and means for electrically linking said cattle prod to said control panel strips.

12. The controller as defined in claim 11 wherein said controller comprises signal means for producing a conditioning stimulus for training said animals to respond to the presence of said controller even in the absence of an electric shock.

13. The controller as defined in claim 12 wherein said signal means comprises sound generating means.

14. The controller as defined in claim 13 wherein said signal means comprises visual ascending motion display generating means.

15. A portable electrified livestock controller for guiding animals such as pigs in a desired direction, said controller comprising:
- a control panel comprising a top, a bottom, and a pair of sides, and a plurality of vertically oriented ribs spaced apart between said sides and extending generally between said top and said bottom;
- a plurality of conductor strips, each strip longitudinally disposed upon one of said ribs for contacting and shocking livestock;
- means for selectively electrifying said conductor strips;
- handle means for facilitating manual manipulation of said controller; and,
- means for generating a visual display of ascending motion for controlling said animals, said ascending motion generator comprising a revolving curtain having a generally spiral image formed thereupon.

16. The controller as defined in claim 15 wherein said controller comprises a control panel having at least two vertically oriented spaced apart ribs, and said revolving curtain is disposed behind said control panel, whereby said vertical ribs partially occlude said spiral image.

17. The controller as defined in claim 16 wherein said controller comprises
- a pair of movable accessory panels operatively associated with said control panel, each accessory panel comprising a top, a bottom, inner and outer sides, a plurality of vertically oriented ribs spaced apart between said last mentioned inner and outer sides and extending generally between said accessory panel top and said accessory panel bottom, and a plurality of conductor strips electrically interconnected with said control panel strips, each accessory panel strip longitudinally disposed upon one of said last mentioned ribs for contacting and shocking livestock; and,
- hinge means for operatively pivotally linking said accessory panels to said control panel, said hinge means comprising detent means for yieldably maintaining said accessory panels in a desired orientation relative to said control panel, said detent means comprising a plurality of indexing discs which are configured to be mated together.

18. An electrified livestock controller for guiding animals such as pigs, said controller comprising:
- a control panel comprising a top, a bottom, and a pair of sides, said control panel comprising a plurality of vertically oriented ribs spaced apart between said sides and extending between said top and said bottom;
- a plurality of conductor strips, each strip longitudinally disposed upon one of said ribs for contacting and shocking animals;
- a plurality of elongated slots extending generally vertically between said top and said bottom for preventing the accumulation of excrement on said controller, a slot disposed between adjacent ribs;
- handle means associated with said control panel for facilitating manual manipulation of said controller;
- at least one movable accessory panel operatively associated with said control panel and comprising a plurality of vertically oriented ribs, a plurality of elongated, vertical panel slots for preventing the accumulation of excrement on said controller panel, a vertical panel slot disposed between said last mentioned ribs, a plurality of conductor strips for shocking animals, said last mentioned conductor strips electrically interconnected with said control panel strips; and,
- hinge means for operatively pivotally linking said at least one accessory panel to said control panel.

19. The controller as defined in claim 18 wherein said control panel comprises a pair of opposite sides and top and bottom corners defined upon at least one of its sides;

and said hinge means comprises an upper link extending between a top corner of said control panel and the top corner of the inner side of said at least one accessory panel, and a lower link extending between a bottom corner of said control panel and the bottom corner of the inner side of said at least one accessory panel.

20. The controller as defined in claim 19 wherein said hinge means comprises detent means for yieldably maintaining said at least one accessory panel in a desired orientation relative to said control panel.

21. The controller as defined in claim 20 wherein said detent means comprises a plurality of indexing discs which are configured to be mated together, separate indexing discs being associated with the top and bottom corners of said control panel, with the top and bottom corners of the inner side of said at least one accessory panel, and with opposite ends of said links, whereby the indexing discs associated with said links will engage with the discs defined on said control panel and said at least one accessory panel when said detent means is engaged.

22. The controller as defined in claim 21 wherein said hinge means comprises knob means for selectively compressing said indexing disks together, and threaded rod means associated with at least one side of said control panel and with the inner side(s) of said at least one accessory panel adapted to threadably receive said knob means, thereby facilitating the selective manual deployment of said controller in a desired configuration.

23. A portable electrified livestock controller for guiding animals such as pigs, said livestock controller comprising:
   a control panel comprising a plurality of elongated ribs;
   a plurality of conductor strips, each strip longitudinally disposed upon one of said ribs for contacting and shocking livestock;
   means for selectively electrifying said conductor strips;
   a plurality of elongated slots for preventing the collection of excrement on said controller, a slot disposed between adjacent ribs;
   handle means for facilitating manual manipulation of said controller; and,
   means associated with said controller for generating a visual display of ascending motion for controlling said animals.

24. The controller as defined in claim 23 wherein said ascending motion generator comprises a revolving curtain having a generally spiral image formed thereupon, said revolving curtain secured behind said control panel and visible to said animals between said slots.

25. The controller as defined in claim 24 wherein said controller comprises at least one movable accessory panel operatively associated with said control panel, said at least one accessory panel comprising a plurality of elongated ribs having a plurality of conductor strips electrically interconnected with said control panel strips, and a plurality of elongated panel slots, a panel slot disposed between adjacent panel ribs.

26. The controller as defined in claim 25 including hinge means for operatively pivotally linking said at least one accessory panel to said control panel, said hinge means comprising detent means for yieldably maintaining said at least one accessory panel in a desired orientation relative to said control panel, said detent means comprising a plurality of indexing discs which are configured to be mated together.

* * * * *